United States Patent
Oude Kotte et al.

(10) Patent No.: US 11,984,765 B2
(45) Date of Patent: May 14, 2024

(54) ROTOR TUBE FOR AN ELECTRIC MACHINE OF A VEHICLE

(71) Applicant: SIEMENS MOBILITY GMBH, Munich (DE)

(72) Inventors: Freerk Jacobus Oude Kotte, Stein (DE); Peter Seitz, Pommelsbrunn (DE)

(73) Assignee: Siemens Mobility GmbH, Munich (DE)

( * ) Notice: Subject to any disclaimer, the term of this patent is extended or adjusted under 35 U.S.C. 154(b) by 499 days.

(21) Appl. No.: 17/280,344

(22) PCT Filed: Sep. 3, 2019

(86) PCT No.: PCT/EP2019/073382
§ 371 (c)(1),
(2) Date: Mar. 26, 2021

(87) PCT Pub. No.: WO2020/064272
PCT Pub. Date: Apr. 2, 2020

(65) Prior Publication Data
US 2021/0367466 A1    Nov. 25, 2021

(30) Foreign Application Priority Data
Sep. 26, 2018  (DE) .......................... 102018216490.8

(51) Int. Cl.
*H02K 1/30* (2006.01)
*B61C 9/38* (2006.01)
(Continued)

(52) U.S. Cl.
CPC .................. *H02K 1/30* (2013.01); *B61C 9/38* (2013.01); *H02K 1/32* (2013.01); *H02K 7/085* (2013.01)

(58) Field of Classification Search
CPC ... B61C 9/38; H02K 1/30; H02K 1/32; H02K 7/085; H02K 7/083; Y02P 20/55
See application file for complete search history.

(56) References Cited

U.S. PATENT DOCUMENTS

| 5,698,913 | A | 12/1997 | Yagi et al. | |
| 7,812,486 | B2 * | 10/2010 | Pfannschmidt | ........... B61C 9/38 |
| | | | | 310/58 |

(Continued)

FOREIGN PATENT DOCUMENTS

| CN | 102905965 A | 1/2013 |
| CN | 103166342 A | 6/2013 |

(Continued)

OTHER PUBLICATIONS

DE-102015213609-A1, Hoffman , all pages (Year: 2017).*

*Primary Examiner* — Naishadh N Desai
(74) *Attorney, Agent, or Firm* — Laurence A. Greenberg; Werner H. Stemer; Ralph E. Locher

(57) ABSTRACT

A rotor tube for an electric machine of a vehicle includes an outer tube and first and second coupling sections coupled to the outer tube at opposite end regions of the outer tube relative to a longitudinal axis of the rotor tube. First and second hubs are coupled to the outer tube at the opposite end regions of the outer tube relative to the longitudinal axis of the rotor tube. A ventilation element is coupled to the outer tube. An inner tube is disposed within the outer tube relative to the longitudinal axis of the rotor tube such that the outer tube surrounds the inner tube. At least two components selected from the first coupling section, second coupling section, first hub, second hub, outer tube, ventilation element and inner tube are formed in one piece as a cast component.

7 Claims, 3 Drawing Sheets

(51) Int. Cl.
    *H02K 1/32* (2006.01)
    *H02K 7/08* (2006.01)

(56) References Cited

U.S. PATENT DOCUMENTS

| | | | |
|---|---|---|---|
| 2006/0022541 A1* | 2/2006 | Ong | H02K 7/003 |
| | | | 310/156.31 |
| 2013/0057047 A1 | 3/2013 | Nord et al. | |
| 2013/0193687 A1 | 8/2013 | Yu et al. | |
| 2016/0301280 A1 | 10/2016 | Freitag et al. | |
| 2017/0237316 A1* | 8/2017 | Filgertshofer | H02K 7/083 |
| | | | 310/52 |

FOREIGN PATENT DOCUMENTS

| | | | | |
|---|---|---|---|---|
| CN | 202965933 U | 6/2013 | | |
| CN | 204696819 U | 10/2015 | | |
| CN | 105765830 A | 7/2016 | | |
| DE | 69602307 T2 | 10/1999 | | |
| DE | 10345888 A1 | 4/2005 | | |
| DE | 102007039186 A1 | 2/2009 | | |
| DE | 102013202592 A1 | 8/2014 | | |
| DE | 102015213609 A1 * | 1/2017 | | H02K 1/276 |
| DE | 102015213609 A1 | 1/2017 | | |
| DE | 102016202416 A1 | 8/2017 | | |
| EP | 1477380 A1 | 11/2004 | | |
| WO | 2006051046 A1 | 5/2006 | | |
| WO | 2009024485 A2 | 2/2009 | | |

* cited by examiner

ROTOR TUBE FOR AN ELECTRIC MACHINE OF A VEHICLE

BACKGROUND OF THE INVENTION

Field of the Invention

The present invention relates to a rotor tube for an electric machine of a vehicle, in particular a rail vehicle. Furthermore, the invention relates to an electric machine with a rotor tube as well as to a vehicle with such an electric machine.

In rail vehicles with what is known as a direct drive, a motor rotor drives the wheelset shaft directly, without a gear unit. As a rule, such a rotor tube has to fulfill a plurality of functions and is constructed of a plurality of individual parts, which are to be coordinated with one another accordingly within strict tolerances.

SUMMARY OF THE INVENTION

The invention is based on the object of creating a rotor tube for a motor or an electric machine of a vehicle, which can contribute to a simplified and cost-effective manufacturing and enables a reliable and safe operation of the electric machine.

This object is achieved by the features of the independent claim. Advantageous embodiments are indicated in the subclaims.

In accordance with a first aspect, a rotor tube for an electric machine of a vehicle comprises an outer tube, a first and a second coupling section as well as a first and second hub. The coupling sections and the hubs are coupled to the outer tube at opposite end regions of the outer tube in relation to a longitudinal axis of the rotor tube. The rotor tube further comprises a ventilation element, which is coupled to the outer tube, and an inner tube, which is arranged inside the outer tube in relation to the longitudinal axis of the rotor tube, so that the outer tube surrounds the inner tube. At least two components, consisting of first coupling section, second coupling section, first hub, second hub, the outer tube, the ventilation element and the inner tube, are embodied in one piece by means of casting and realize a common cast component.

By means of the described construction of a rotor tube, it is possible to realize cost savings during the manufacturing and a contribution additionally may be made to a safe and reliable functionality of the rotor tube and an associated electric machine.

As a result of at least two, preferably more than two components being embodied as a common cast component, these individual components are integrated in a single structural part with a plurality of functions. Compared to a multi-part construction, fewer structural parts are therefore required and the rotor tube can be manufactured in a material-saving manner, meaning that it is possible to realize a corresponding weight advantage. Due to the fewer structural parts to be manufactured, an assembly of the rotor tube can be performed with less outlay and more time saved. It is thus possible to save further costs and it is also easier to meet technical requirements for the rotor tube.

Moreover, parting lines between individual structural parts are avoided or reduced, which in each case represent a potential problem location, for example with regard to fit and corrosion. Due to the integration of a plurality of components in one integrated cast part, such parting lines are dispensed with and a contribution may be made to a reliable operation and an increased service life of the rotor tube and to an electric machine provided with such a rotor tube. Additionally, a contribution may be made to a higher level of stability in this manner.

In particular, such a rotor tube may be used for an electric machine of a rail vehicle and may contribute to a reliable and safe operation of the electric machine. For example, a rail vehicle with its own direct drive is involved, in which the rotor tube drives the wheelset shaft directly, without a gear unit, via a coupling. In this context, due to the high torque, directly driving permanently excited synchronous machines are preferably used. In such electric machines, the wheelset shaft runs through the machine and the rotor tube is coupled to the wheelset shaft by means of the coupling.

Due to the permanently excited magnets, such an electric machine is constructed in an encapsulated manner as a rule and is cooled via a water jacket, for example. In order to dissipate heat from the rotor tube, a closed air cooling circuit is also provided inside the machine, for example, which transports the heat into the cooling water via the water jacket, for example. Such a construction of a machine and an inner cooling circuit requires a particular construction of the rotor tube, which is designed in a double-walled manner and simultaneously fulfills a plurality of functions. By means of the rotor tube, the torque is transferred to the wheelset shaft by means of a coupling and the air in the inner cooling circuit is also circulated by the ventilation element of the rotor tube.

The inner tube prevents a contamination of the interior of the rotor tube and seals off the inner cooling circuit. In relation to the longitudinal axis of the rotor tube, the inner tube is arranged radially closer to the longitudinal axis than the outer tube. In other words, the inner tube and the outer tube are embodied in a cylindrical manner, for example, so that a diameter of the inner tube is smaller than a diameter of the outer tube. The outer tube connects the hubs to the active part and is embodied for accommodating the laminated core or the internal components of the rotor tube.

The coupling sections in each case realize sections of the rotor tube that can be coupled to further components, such as bearings to be attached. The coupling sections represent rotor tube bearing points and embody a coupling point for attaching the bearing. The coupling sections therefore may also be referred to as bearing points. The first coupling section is arranged on the drive side, for example, and also serves as a connection point for the coupling, which is screwed to the first coupling section for example. Moreover, the first and/or second coupling section may also be provided for attaching further components. Particularly in a possible two-sided output of an associated machine, both coupling sections may be provided as coupling or bearing points.

The first and second hub are shaped in an open manner, for example, or are provided with recesses, so that air can run between the inner tube and the outer tube, by way of the internal cooling. The ventilation element functions as a fan, which circulates the air for the internal cooling and contributes to a reliable removal of heat.

In conventional rotor tubes, the various components are machined individually and are subsequently assembled. The hubs are inter alia pressed onto the inner tube and additionally the torque is transferred with the inner tube, so that this is to be embodied in a thick-walled manner accordingly. In turn, the outer tube is positioned on the hubs and connected thereto, in order to embody a double-walled rotor tube. In this context, tolerances of the individual structural parts have to be strictly adhered to, in order to satisfy the technical requirements of the rotor tube and to enable reliable functioning of the rotor tube.

By means of the rotor tube described, assembly is simplified and tolerance conditions are mitigated, as a result of individual parts being designed together as a cast structural part. This further enables the use of a thin-walled inner tube as a simple protective tube, in order to close off and seal off the interior of the rotor tube toward the inside.

In accordance with a preferred development of the rotor tube, the first hub, the second hub and the outer tube are embodied in one piece by means of casting and realize the cast component. In accordance with a particularly preferred development, the first and the second coupling section are furthermore also embodied in one piece by means of casting and realize the cast component.

The ventilation element may also further be embodied in the integrated cast component by means of casting. Preferably, the ventilation element is integrated into the second hub, in order to realize a space-saving and material-saving construction of the rotor tube.

The first bearing point or the first coupling section is embodied in one piece with the outer tube by means of the first hub, for example and, in an end region of the outer tube, is connected thereto on an inner side of the outer tube. The second hub with integrated ventilation element, and subsequently the second coupling section, connect to the opposite end region of the outer tube, furthermore embodied in one piece, for example. Coupling sections and hubs, as well as ventilation element, are then integrated into the outer tube and assembled as one structural part. In this manner, a compact cast structural part is produced, which enables reliable and advantageous functioning of the rotor tube.

In accordance with a development of the rotor tube, the first and second hub are arranged on an inner side of the outer tube, which faces the inner tube. In accordance with a further development of the rotor tube, the first coupling section is coupled to the inner side of the outer tube by means of the first hub and the second coupling section is coupled to the inner side of the outer tube by means of the second hub.

In accordance with a development, the rotor tube comprises one or more positioning elements, which are embodied to position the inner tube relative to the outer tube in a predefined position in relation to the longitudinal axis. Such positioning elements realize assembly aids, in order to predefine end stops for a position of the inner tube inside the outer tube, for example, or in order to configure a reliable tube centering with regard to the longitudinal axis.

In accordance with a development of the rotor tube, the at least one positioning element is likewise embodied in one piece by means of casting, so that it also realizes the cast component.

In accordance with a further aspect, an electric machine comprises an embodiment of the previously described rotor tube, which is coupled to the electric machine. The rotor tube may find particular use in directly driving permanently excited synchronous machines for a direct drive of a vehicle, particularly a wheelset shaft of a rail vehicle. Moreover, however, it is also possible to use such a rotor tube in motor vehicles, in particular heavy goods vehicles, wherein the rotor tube may have a coupling point at each of the two ends. Due to the rail vehicle comprising an embodiment of the previously described rotor tube, where applicable, described properties and features of the rotor tube are also disclosed for the rail vehicle, and vice versa.

In accordance with a further aspect, a vehicle comprises at least one previously described electric machine. In this context, the vehicle may be embodied as a rail vehicle and the electric machine in particular may drive a wheelset shaft.

Exemplary embodiments of the invention are described in greater detail in the following, making reference to the schematic drawings.

DETAILED DESCRIPTION OF THE INVENTION

Figure 1:
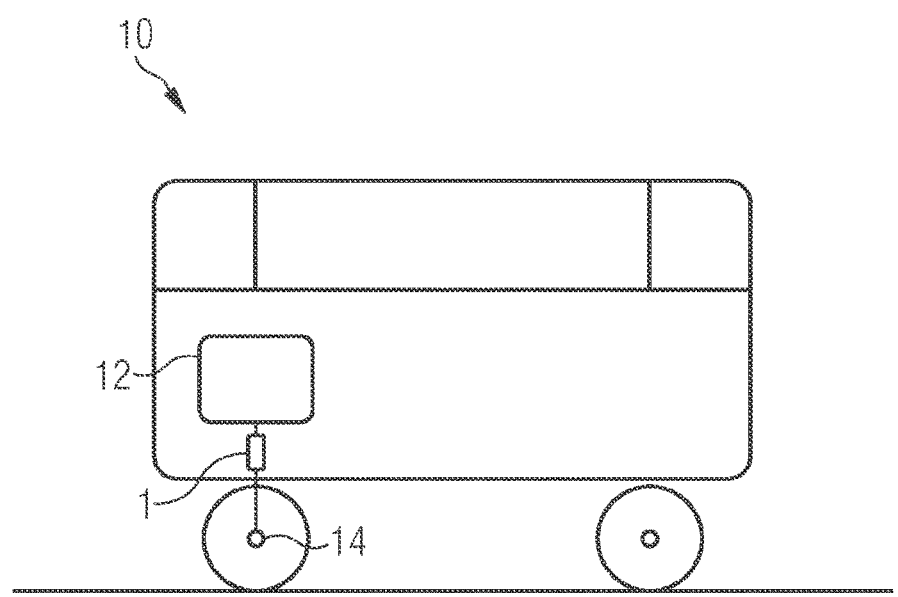
FIG. 1 shows a schematic representation of a rail vehicle.

Elements of the same construction and function are marked with the same reference characters across all figures.

Figure 2:
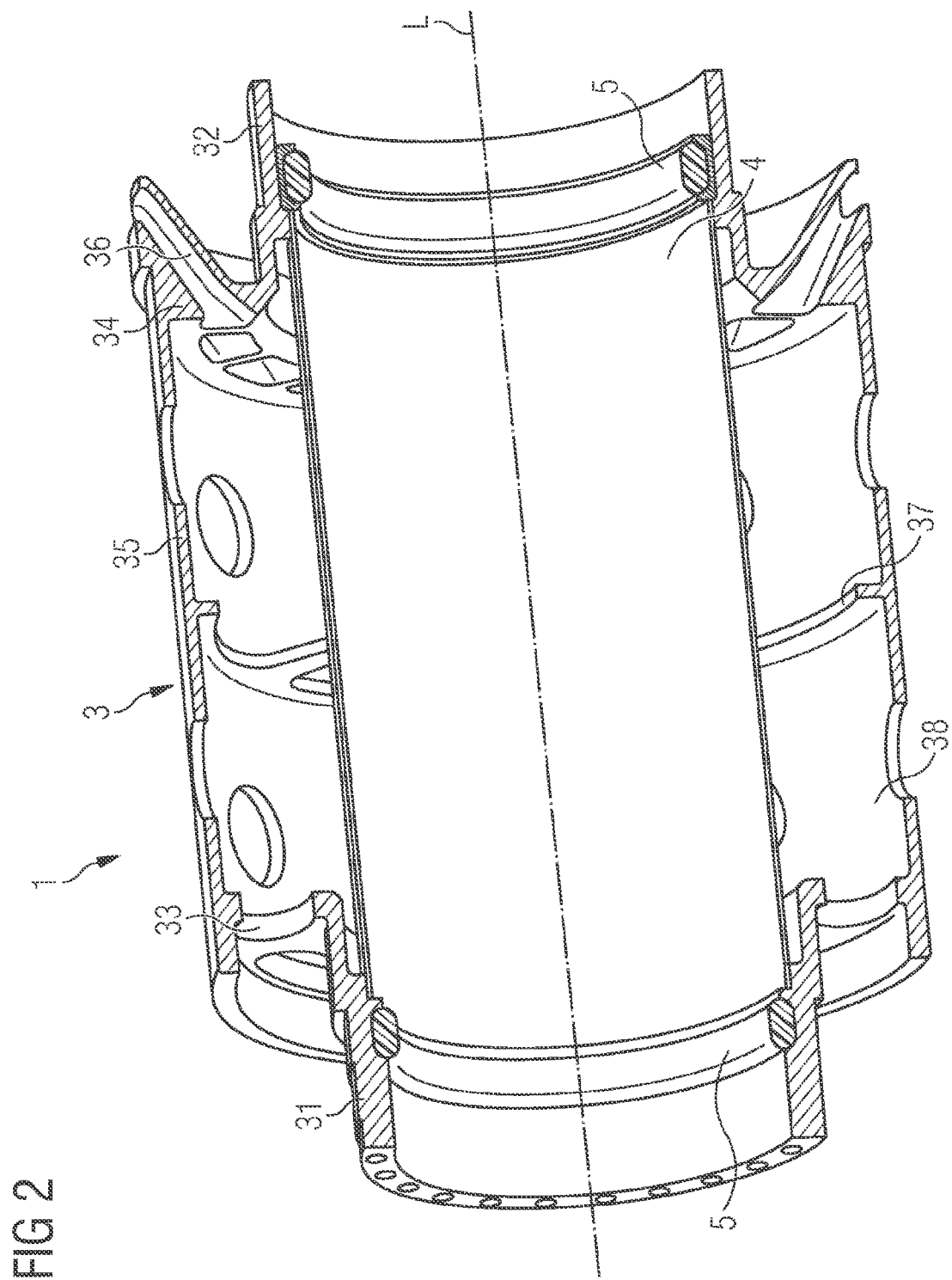
FIG. 2 shows an exemplary embodiment of a rotor tube for an electric machine of the rail vehicle in accordance with FIG. 1.
Figure 3:
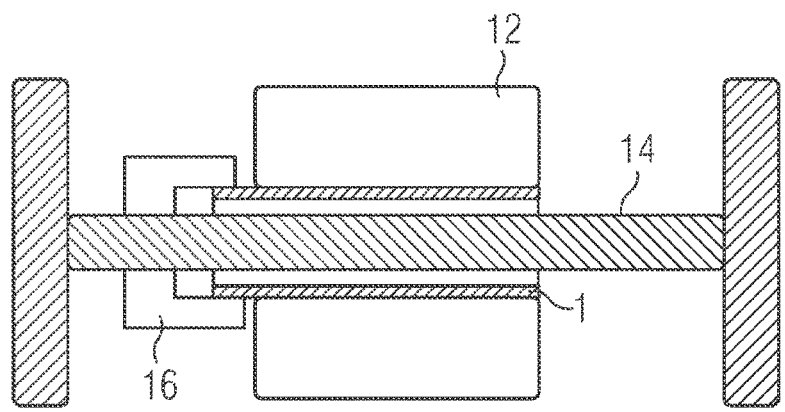
FIG. 3 shows a schematic representation of the rotor tube coupled to an electric machine of the rail vehicle in accordance with FIGS. 1 and 2.

FIG. 1 shows, in a schematic side view, a rail vehicle 10 with an electric machine 12, which is coupled to a wheelset shaft 14 by means of a rotor tube 1 and a coupling 16 (see FIG. 3). By means of the rotor tube 1, the torque of the machine 12 is transferred to the wheelset shaft 14 and air is also circulated in an inner cooling circuit. As explained below with reference to FIG. 2, the construction of the rotor tube 1 enables cost savings during manufacturing and also a safe and reliable functionality of the rotor tube 1 and the associated machine 12.

FIG. 2 shows a possible embodiment of the rotor tube 1 in a perspective view. The rotor tube 1 comprises a cast component 3 which surrounds an inner tube 4 in a cylindrical manner. The cast component 3 is embodied in one piece by means of casting and has an outer tube 35, a first and a second coupling section 31, 32, which are coupled to the outer tube 35 at opposite end regions of the outer tube 35 in relation to the longitudinal axis L of the rotor tube 1, and a first and second hub 33, 34, which are coupled to the outer tube 34 at the opposite end regions of the outer tube 35 in relation to the longitudinal axis L of the rotor tube 1. The cast component 3 further comprises a ventilation element 36, which is coupled to the outer tube 35 and is embodied such that it is integrated in the second hub 34. In this manner, it is possible to realize a particularly space-saving and material-saving construction of the rotor tube 1. Moreover, the cast component 3 has an annular positioning element 37, which is embodied on an inner side 38 of the outer tube 35.

Moreover, two further positioning elements 5 are present, which, as with the positioning element 37 of the cast component, enable a holding and positioning of the inner tube 4 and a simplified assembly of the rotor tube 1, acting as an assembly aid. The inner tube 4 is arranged inside the outer tube 35 in relation to the longitudinal axis L of the rotor tube 1, so that the outer tube 35 surrounds the inner tube 4. The positioning element 37 preferably has a plurality of finger elements, which extend radially toward the inside in the direction of the longitudinal axis L and, in an assembled state of the rotor tube 1, contact an outer side of the inner tube 4, which faces the outer tube 35.

The illustrated rotor tube 1 is therefore substantially constructed from two individual structural parts: the cast component 3 and the inner tube 4. In an alternative embodiment of the rotor tube 1, a different breakdown of the integration of individual parts may also be provided. For example, the inner tube 4 may be designed as a cast structural part in a reinforced design with the coupling sections 31, 32, the hubs 33, 34 and the ventilation element 36, and may realize a common cast component, onto which the outer tube 35 is slid.

The first and second coupling section 31, 32 form respective bearing points and in each case may be embodied in one piece with the inner tube 4 by means of casting on the outer tube 35 or the cast component, or a coupling section 31 may be designed such that it is integrated with the outer tube 35 and the other coupling section 32 may be designed such that it is integrated with the inner tube 4.

At least two components, consisting of first coupling section 31, second coupling section 32, first hub 33, second hub 34, the outer tube 35, the ventilation element 36 and the inner tube 4, are embodied in one piece by means of casting as a cast component 3, in order to realize a compact and advantageous construction of the rotor tube 1. In accordance with the exemplary embodiment shown in FIG. 2, seven functional structural parts are embodied in one piece in a common cast component 3: the first coupling section 31, which is coupled to the inner side 38 of the outer tube 35 by means of the first hub 33; the second coupling section 32, which is coupled to the inner side 38 of the outer tube 35 by means of the second hub 34; the ventilation element 36, which is embodied such that it is integrated in the second hub 36; and the positioning element 37, which is embodied on the inner side 38 of the outer tube 35.

Alternatively, the inner tube 4 with the first hub 33 and the outer tube 35 with the second hub 34 and optionally with the ventilation element 36 may also be embodied as a cast component in each case, which realize an embodiment of the rotor tube 1 when coupled together. The outer tube 35 may also be provided as a rolled tube or embodied in a thin-walled manner by means of centrifugal casting.

The inner tube 4 seals off the inner cooling circuit of the rotor tube 1 and prevents contamination of the interior. By means of the construction described, it is not necessary to press further structural parts onto the inner tube 4, and a flow of force and a torque transfer onto the outer tube 35 also take place by way of the coupling sections 31, 32. The inner tube 4 may therefore be embodied from stainless steel with a relatively low wall thickness of a few millimeters, for example. Compared to conventional rotor tubes, the inner tube 4 of the rotor tube 1 described can be embodied with considerably thinner walls, preferably by way of metal spinning or rolling, so that a contribution is made to saving material, weight and costs. Alternatively, the inner tube 4 may also be manufactured from a glass-fiber-reinforced plastic and embodied in a particularly lightweight manner.

The inner tube 4 forms a segment, which in an assembled state of the rotor tube 1 connects to an overall inner tube, which is interrupted in the region between the first hub 33 and the second hub 34 for casting-related and machining-related reasons, in order to be able to postprocess the inner side 38 of the outer tube 35 inter alia following the casting. In order to close such an interrupting opening following the machining, the inner tube 4 is installed in the rotor tube 1, for example as a kind of protective tube made of sheet metal, and is coupled to the overall inner tube of an associated machine. The inner tube 4 therefore represents an integrated protective tube, which closes the interrupted overall inner tube off again in relation to the associated machine in an assembled state.

The bearing points or the coupling sections 31, 32 serve to accommodate respective bearings and for screwing or attaching the coupling 16 of the machine 12. The hubs 33, 34 have recesses, which function as air holes and, together with the ventilation element 36, enable a predefined cooling air flow. The ventilation element 36 has a plurality of air ducts for example, which extend obliquely through the second hub 34 with a predefined incline.

As a result of at least two, or as shown seven, structural parts being embodied as a common cast component 3, these individual structural parts are integrated in a single structural part with a plurality of functions. Compared to a multi-part construction, fewer structural parts are therefore required and the rotor tube 1 can be manufactured in a material-saving manner, meaning that it is possible to realize a corresponding weight advantage. Due to the fewer structural parts to be manufactured, an assembly of the rotor tube 1 can be performed with less outlay and more time saved. It is thus possible to save further costs and it is also easier to meet technical requirements for the rotor tube.

Moreover, parting lines between the individual structural parts are avoided or reduced, which in each case represent a potential problem location, for example in relation to fit and corrosion. Due to the integration of a plurality of components in one integrated cast part, such parting lines are dispensed with and a contribution may be made to a reliable operation and an increased service life of the rotor tube 1 and to the machine 12 provided with the rotor tube 1. Additionally, the described embodiment of the rotor tube 1 contributes to a higher level of stability, and to a safe and reliable operation as a result.

FIG. 3 schematically illustrates the rotor tube 1 in a built-in state in the electric machine 12 of the rail vehicle 10. The rotor tube 1 surrounds the wheelset shaft 14 and is coupled thereto by means of the coupling 16.

LIST OF REFERENCE CHARACTERS 1 rotor tube
10 vehicle
12 electric machine of the vehicle
14 wheelset shaft of the vehicle
16 coupling of the vehicle
3 cast component
31 first coupling section of the cast component
32 second coupling section of the cast component
33 first hub of the cast component
34 second hub of the cast component
35 outer tube of the cast component
36 ventilation element of the cast component
37 positioning element of the cast component
4 inner tube
5 positioning element
L longitudinal axis

The invention claimed is:
1. An electric machine for a rail vehicle, the electric machine being a permanent magnet-excited synchronous machine for a direct drive of a wheelset shaft of the rail vehicle, the electric machine comprising:
    a rotor tube surrounding the wheelset and being coupled to the wheelset by a coupling, the rotor tube including:
        a longitudinal axis of the rotor tube;
        an outer tube having opposite end regions;
        a first coupling section and a second coupling section each coupled to a respective one of said opposite end regions of said outer tube relative to said longitudinal axis of the rotor tube, at least said first coupling section serving as a connection point for the coupling;

a first hub and a second hub each coupled to a respective one of said opposite end regions of said outer tube relative to said longitudinal axis of the rotor tube;

a ventilation element coupled to said outer tube; and an inner tube disposed inside said outer tube relative to said longitudinal axis of the rotor tube, said inner tube being surrounded by said outer tube;

said first coupling section, said second coupling section, said first hub, said second hub, said outer tube, and said ventilation element being formed in one piece as a cast component.

2. The electric machine according to claim 1, wherein said ventilation element is integrated into said second hub.

3. The electric machine according to claim 1, wherein said first hub and said second hub are disposed on an inner side of said outer tube facing said inner tube.

4. The electric machine according to claim 3, wherein:
said first coupling section is coupled to said inner side of said outer tube by said first hub; and
said second coupling section is coupled to said inner side of said outer tube by said second hub.

5. The electric machine according to claim 1, which further comprises at least one positioning element configured to position said inner tube relative to said outer tube in a predefined position relative to said longitudinal axis of the rotor tube.

6. The electric machine according to claim 5, wherein said at least one positioning element is formed in one piece with said cast component.

7. A rail vehicle, comprising at least one electric machine according to claim 1.

* * * * *